United States Patent [19]

Grube et al.

[11] 4,079,837

[45] Mar. 21, 1978

[54] SYSTEM FOR THE SEPARATION OF FRAGMENTED SOLID WASTE

[76] Inventors: Kenneth E. Grube, 150 Anchorage Cir., Groton, Conn. 06340; Vincent E. Harrington; James V. Harrington, both of 19 Dolphin Rd., Groton, Conn. 06320

[21] Appl. No.: 654,051

[22] Filed: Jan. 30, 1976

Related U.S. Application Data

[63] Continuation of Ser. No. 451,087, Mar. 14, 1974, abandoned.

[51] Int. Cl.$^2$ .............................................. B03B 7/00
[52] U.S. Cl. ...................................... 209/12; 209/138; 71/64 JC; 241/DIG. 38
[58] Field of Search .................... 209/12, 2, 138, 173, 209/172.5, 214, 39, 40, 38, 33, 36, 37, 3; 23/259.1; 71/9, 14, 64 JC

[56] References Cited

U.S. PATENT DOCUMENTS

| | | | |
|---|---|---|---|
| 192,941 | 7/1877 | Smith | 209/37 |
| 236,672 | 1/1881 | Coombes | 209/37 |
| 488,064 | 12/1892 | Chase | 209/223 A X |
| 501,037 | 7/1893 | Arnold | 71/14 |
| 565,577 | 8/1896 | Stanley | 209/12 |
| 816,560 | 4/1906 | Cooley | 209/138 |
| 835,689 | 11/1906 | Sevell | 71/14 |
| 1,139,484 | 5/1915 | Bryan | 209/12 X |
| 1,209,654 | 12/1916 | Anderson | 209/173 |
| 1,250,554 | 12/1917 | Bryan | 209/12 |
| 1,264,024 | 4/1918 | Davis | 209/138 |
| 1,832,179 | 11/1931 | Boggiano-Pico | 23/259.1 X |
| 2,539,990 | 1/1951 | Chapman | 241/1 X |
| 2,620,069 | 12/1952 | Wendt | 209/172.5 |
| 2,798,800 | 7/1957 | Geraghty | 71/645 C X |
| 3,524,594 | 8/1970 | Anderson | 241/24 X |
| 3,549,092 | 12/1970 | Baxter | 241/24 X |
| 3,643,797 | 2/1972 | Berkowitz | 209/37 X |
| 3,725,538 | 4/1973 | Brewer | 209/12 X |
| 3,802,031 | 4/1974 | Boyd | 241/24 X |
| 3,817,458 | 6/1974 | Gilberto | 241/20 |
| 3,833,117 | 9/1974 | Mackenzie | 209/3 |
| 3,930,799 | 1/1976 | Eweson | 23/259.1 |

OTHER PUBLICATIONS

Bur. of Mines, Infro. Circular 8595, Mar. 20, 1973, (pp. 3-6).

Meiss, D., Chem. & Met. Eng. (2), pp. 122-125, Feb. 1941.

Primary Examiner—Robert Halper
Attorney, Agent, or Firm—Brumbaugh, Graves, Donohue & Raymond

[57] ABSTRACT

A method for the separation of components of solid waste which has been treated by thermal explosive decompression followed by biodegradation (also hereinafter referred to as composting) is presented. The explosive decompression and composting pretreatment before separation presents a granular and inoffensive finely-divided product mixed with less-fragmented non-biodegradable materials such as plastic, metals and other substances. The method first separates the finely-divided product from the waste to leave a first residue, then magnetically separates any magnetic components from the first residue to leave a second residue, and then separates by gravity flotation any plastic components from the second residue, each step being carried out successively without interruption for further treatment of the waste.

A system is described which separates the biodegradable and fine residues first, followed by the separation of other, more valuable components from each other at later stages of separation.

3 Claims, 4 Drawing Figures

SYSTEM FOR THE SEPARATION OF FRAGMENTED SOLID WASTE

This application is a continuation of copending application Ser. No. 451,087 now abandoned filed Mar. 14, 1974.

BACKGROUND OF THE INVENTION

Americans discard 4 billion tons of trash a year. This great quantity of mixed solid waste materials is becoming an increasingly burdensome environmental problem. One solution proposed in copending application Ser. No. 429,733 now abandoned filed Jan. 2, 1974 for reducing the volume of this waste material fragments it and biodegrades or composts the biodegradable parts for a fragmented and inoffensive product mixed with less-fragmented, non-biodegraded materials. The resultant waste thus will be a mixture of this biodegraded product and plastics, metals, and other non-biodegradable materials normally rejected as trash by households and industries. The proposed volume-reducing solution generally, therefore, is not applicable to largely metallic scrap such as junked cars or appliances.

There is interest in removing scrap that has value from discarded solid waste. The invention described herein facilitates the separation of valuable scrap from suitable waste, such as that processed by the proposed volume-reducing solution described above, and increases the efficiency of separation while reducing its costs.

SUMMARY OF THE INVENTION

The present invention reverses the order of separation of waste components from the normal procedure. In the normal procedure, when trash is processed in a dump site to recover items of value, the trash is first shredded sufficiently to expose its component parts. Those parts of value, such as metals, glass and others are separated from the mass of material by magnetic and other suitable means. The vast bulk of untreated, less valuable waste comprising paper, garbage and other material has to be processed in each separation step and then disposed of. Treatment in this manner leaves the items of value and all of the associated machinery for its separation coated with objectionable material. Much cleaning is required.

The separation process described herein is associated with waste which mostly comprises finely-divided components mixed with some larger components such as municipal waste which has been treated by explosive decompression followed by composting. This process results in the biodegradable portion of the trash being fragmented by explosive decompression and biodegraded by composting to dry granular material. The bulk of the waste material has also been significantly reduced.

This separation process has as a first step the separation of the fragmented and biodegraded organic material components such as biodegraded granular material and glass from the remainder of the less-fragmented material. This first step consists of sifting and air separation processes which leave all of the other less-fragmented material exposed. This vastly reduces the bulk of material sent to further separation processes and also presents it in a dry and inoffensive condition to the further processing steps, thereby greatly reducing cleaning and maintenance requirements of apparatus for carrying-out these steps.

Glass components in the trash will be broken into small fragments by the thermal shock resulting from the suggested treatment process, and may also be separated by sifting. The air separation step, operating on a density principle, will separate the heavier glass fragments from lighter, for example, organic material.

After removal of the more fragmented material such as glass and the fragmented and biodegraded organic material, the resultant material, called the first residue, will consist of metals, plastic and miscellaneous components.

The first residue will be processed through a magnetic separator to remove the magnetic iron and steel components from the waste. The resultant second residue, comprising non-magnetic metals and plastics, as well as miscellaneous other components, next proceeds to a gravity type flotation separator with a dense liquid such as barite in water with a specific gravity of approximately 2.0 which will separate plastics from the metals in the second residue. The third residue, when typical municipal waste is being processed, should contain non-magnetic metals as a major ingredient, and thus have scrap value.

Hence the invention concerns an improved and more efficient combination of means for extracting the material of value from trash which results in improved means for alleviating environmental problems.

DESCRIPTION OF THE PREFERRED EMBODIMENT

A first embodiment of the invention is shown herein. Other arrangements of parts and other details of construction will accomplish like results, resulting in other embodiments which will fulfill the purposes of the invention.

Figure 1:
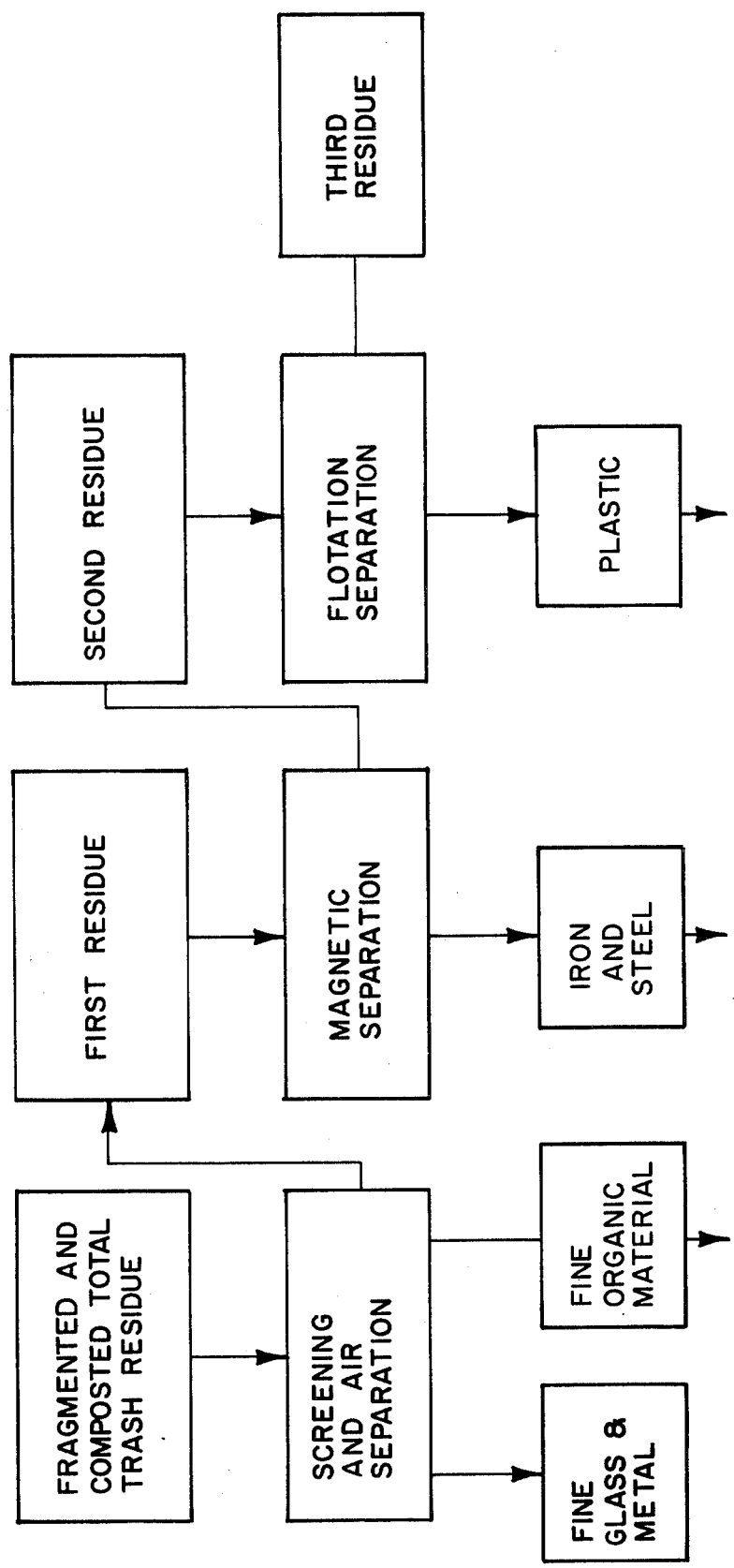
FIG. 1 shows the system block diagram for the separation process.

In FIG. 1 a block diagram is shown which outlines the various steps in the separation process. The total waste materials, as from the composting pit described in the above-mentioned application, is first subject to a screening and air separation process. The purpose of this separation is to remove all of the finely divided matter, such as organic fragmented and biodegraded material along with the fine residues of such substances as glass, metals and plastics, which, by the definition of waste, comprises most of the waste.

The material passing beyond the screening and air separation process shall then comprise mainly the large pieces of non-biodegradable material such as metal containers and metal parts, large segments of glass and plastic material and such other material as has been subject to the fragmenting and composting action but has not been finely fragmented for separation by the screening and air separation process. All material which passes beyond the first separation stage is called the first residue.

The first residue is sent to the magnetic separator in which all magnetic material such as steel cans and other parts are removed by the separator.

Material passing through the magnetic separation process is called the second residue and will consist mainly of plastics, non-ferrous metals and residual glass, and a remainder of nondescript material. This material may be separated by density differentiation in a gravity flotation separation process. Typically with a liquid density of approximately 2.0 the rubber and plastic material will separate by flotation from aluminum, glass and much of the remainder material.

As a measure of the expected efficiency of the process being considered, we refer to Table 1 which presents a typical refuse breakdown from a typical city collection.

Approximately 60% of the tonnage arriving at the dump is material subject to bio-degradation by fragmentation and composting. An additional 10% of the remainder is either subject in part to bio-degradation, or is subject to separation in the processes outlined herein. It may further be pointed out that this 60 to 70% of arriving material, after fragmentation and composting, will be removable in the first separation step, that of screening and air separation. This leaves a first residue comprising 30 to 40% of the arriving material as components of the first residue.

TABLE 1
REFUSE BREAKDOWN
CITY COLLECTION ONLY

| | Percentage range by dry weight | |
|---|---|---|
| Cardboard | 3.9 | 4.3 |
| Newsprint | 9.3 | 9.7 |
| Other paper | 38.7 | 39.2 |
| Yard trimmings | 11.9 | 16.0 |
| Wood | 0.6 | 1.3 |
| Rags/Cloth/Leather/Bedding | 2.4 | 2.6 |
| Tires | 0.1 | 0.2 |
| Other rubber | 0.1 | 0.2 |
| Plastics | 2.2 | 2.1 |
| Garbage | 2.0 | 2.1 |
| Ferrous cans | 5.6 | 6.3 |
| Ferrous metal | 0.9 | 1.2 |
| Aluminum cans | 0.5 | 0.6 |
| Other aluminum | 0.1 | 0.2 |
| Glass | 6.2 | 7.5 |
| Remainder* | 8.9 | 12.2 |

*Remainder is that portion of the refuse consisting of dirt, rocks, badly contaminated paper, etc.

The effluent from the first separation stage shall be fine material, based upon its passage through the screen, biologically inoffensive and dry as the result of the prior composting process and shall be predominately of an organic nature. Fine glass and metal may be returned to the down stream separators for further processing if so desired. The composted organic residue should have value as a land fill material or a top dressing suitable for roadsides, agricultural land, parks and other public and private properties, with or without the addition of chemical supplements to fertilize growth of plantings.

The first residue shall go to subsequent separation stages in a reasonably clean and sensibly inoffensive condition, thereby maintaining the separation equipment in a reasonably clean and sensibly inoffensive condition. Approximately 7% of the remaining tonnage shall be separated in the next stage of separation as ferrous material in accordance with Table 1.

The second residue shall go to the gravity type flotation separation stage where rubber and plastic products shall be separated from aluminum and residual glass that was not removed in the first stage of separation; this will remove an additional 3% of the tonnage in the arriving material. It may be seen that in excess of 80% of arriving material is directly amenable to the separation processes outlined herein and if further separation stages involving crushing and screening residual glass are employed, or if special separation procedures in an individual community are necessary because of the nature of its industry or activity, other separation stages may be added for further refinement.

Figure 2:
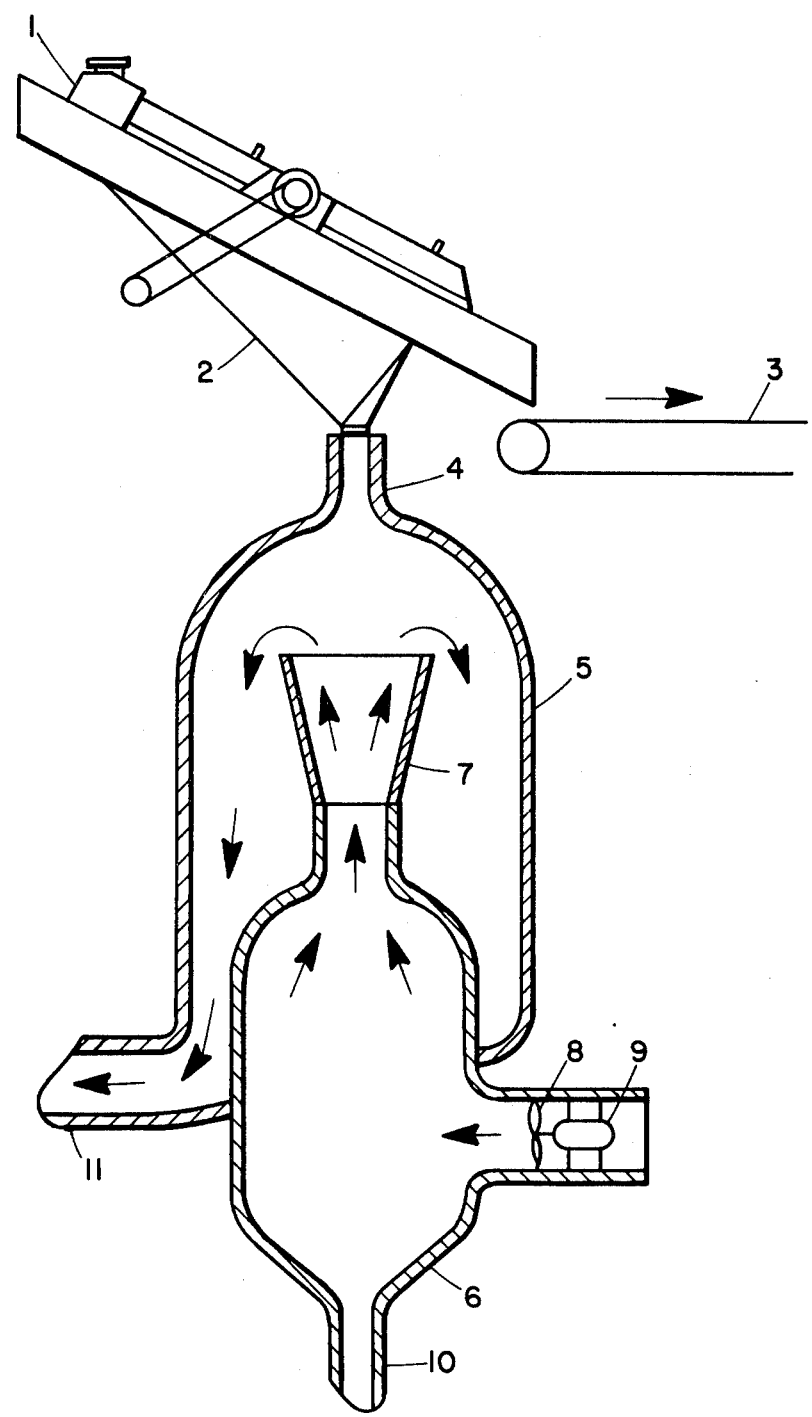
FIG. 2 shows the arrangement of the sifting and air separation phase of the process.

FIG. 2 shows the apparatus used for the screening and air separation stage. A motor driven vibrating screen 1 receives the composted and fragmented waste at its point of entry, and by gravity and mechanical motion sifts the material, causing all material fine enough to pass through the screen to fall into the hopper 2. Material which is too large to fall through the screen is discharged at the vibrator outlet onto conveyor belt 3, where, as the first residue, it passes to further separation stages.

Material flowing into the hopper 2 is discharged at the hopper bottom into the throat section 4 of a separation vessel. The separation vessel is made up of an outer shell 5, an inner shell 6, a throat section 7, a blower 8 driven by motor 9, an inner shell discharge tube 10 and an outer shell discharge tube 11. The blower 8 forces air into the interior of the inner shell 6 from which it flows upward through the throat section 7 downward in the outer shell 5 and outward through the outer shell discharge tube 11. Air is prevented from being discharged through inner shell discharge tube 10 and throat section 4 by a head of material maintained respectively in the bottom of inner shell 6 and hopper 2.

The upward flowing air current in throat section 7 meeting the down flowing spray of particles from throat section 4 will cause separation of the materials in the stream of particles from the said throat section 4 in accordance with the well known law of Stokes. The settling, or terminal velocity of a particle in a fluid stream depends upon its specific gravity, size and shape, and upon the specific gravity and viscosity of the fluid. The classical equation for the settling velocity of a sphere as developed by Stokes is:

$$W = \frac{2}{9} g \frac{P_1 - P_2}{u} r^2$$

where $W$ is the settling velocity, $P_1$ and $P_2$ are the densities of the sphere and the fluid respectively, $g$ is the acceleration of gravity, $r$ is the radius of the sphere and $u$ is the dynamic viscosity of the fluid. All values are in the CGS system.

Other formulations based upon this theory are used in practice, a popular one being:

$$C = 24.9 \sqrt{D S_1}$$

where $C$ is the terminal velocity in feet per minut, $D$ is the particle diameter in microns and $S_1$ is the specific gravity of the particle. This formulation is used for determining the terminal particle velocity in still air.

Table 2 shows the variation of particle terminal velocity for 6,000 micron (0.6 cm) particle with specific gravity varying as shown:

TABLE 2

| $S_1$ | C | $S_1$ | C |
|---|---|---|---|
| 0.2 | 870 | 1.8 | 2580 |
| 0.4 | 1230 | 2.0 | 2740 |
| 0.6 | 1500 | 2.2 | 2870 |
| 0.8 | 1720 | 2.4 | 3000 |

TABLE 2-continued

| $S_1$ | C | $S_1$ | C |
|---|---|---|---|
| 1.0 | 1930 | 2.6 | 3100 |
| 1.2 | 2120 | 2.8 | 3230 |
| 1.4 | 2280 | 3.0 | 3350 |
| 1.6 | 2460 | | |

It may be seen from Table 2 that an air velocity of 2000 ft/min (33.3 ft/sec) will effectively separate 6000 micron particles below a specific gravity of 1.0 from particles of the same size with a specific gravity greater than 1.0 The process may control particle size and density separation by the size of screen and by the air stream velocity. In the event that a wide assortment of sizes and densities are to be accommodated several venturi nozzles operating in series will provide the desired degree of separation in accordance with the proper application of the analysis and data as presented.

Figure 3:
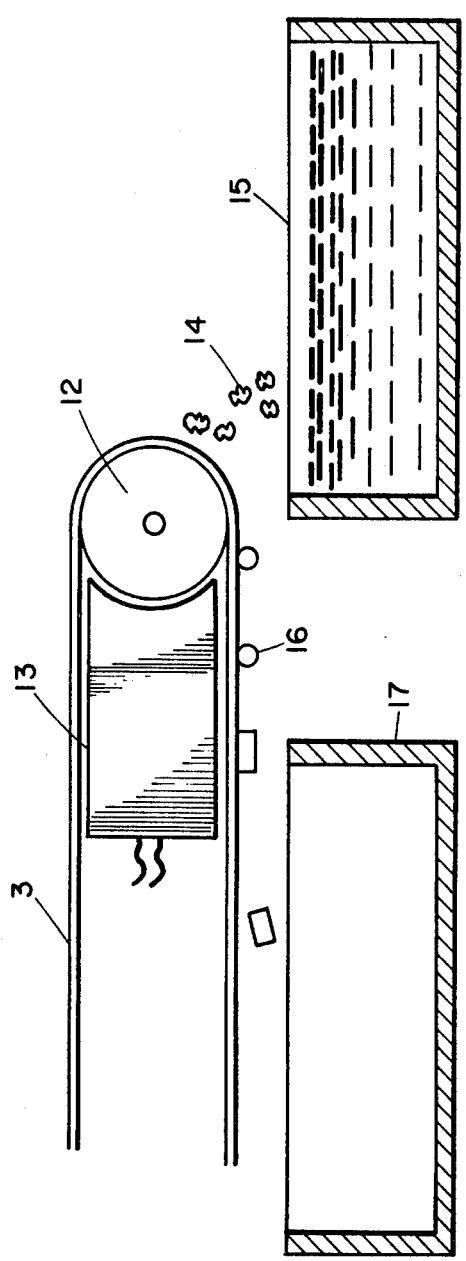
FIG. 3 shows the arrangement of the magnetic material separation phase of the process.

FIG. 3 shows the arrangement of the magnetic separation unit, which brings the first residue to the process by an extension of the conveyor belt 3 shown in FIG. 2. An electromagnet 13 and electromagnetic pulley 12 cause magnetic e.g. ferrous material 16 to cling to the conveyor belt 3 as its rounds pulley 12 and passes under electromagnet 13. At least at the end of the electromagnet but not before the belt and magnetic material pass beyond pulley 12, the attractive force diminishes with distance in accordance with well known physical laws, causing the magnetic material to fall from the belt into container 17. Non-ferrous material 14, comprised mainly of aluminum, plastic, residual glass and remainder residue, is not attracted by the electromagnet and falls directly from the end of the conveyor belt, as the second residue into the flotation separator 15.

Figure 4:
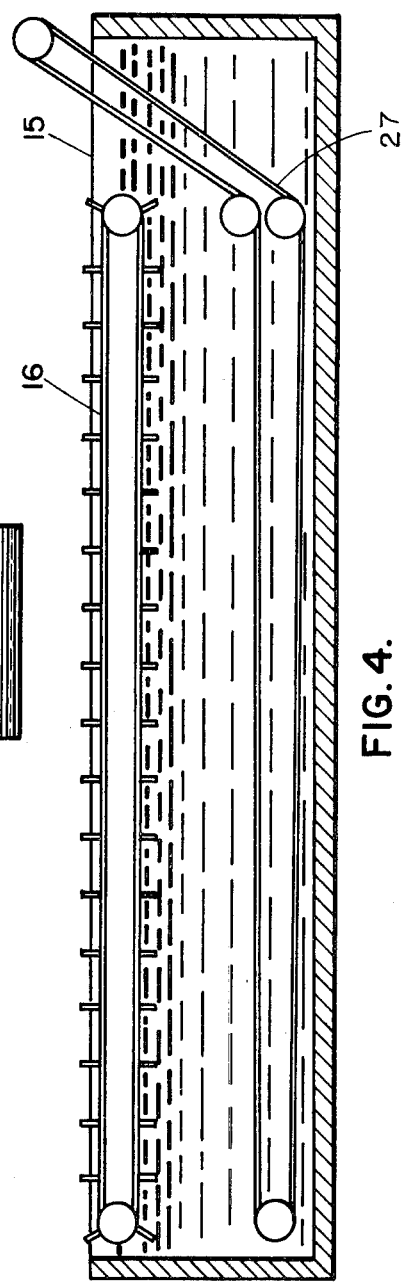
FIG. 4 shows the arrangement of the flotation separation phase of the process.

FIG. 4 shows the arrangement of the gravity-type flotation separator. It contains a vat 15 filled with a liquid which has a predetermined specific gravity, which for purposes of illustration will be stated as 2.0. The end of conveyor belt 3 discharges the second residue into vat 15, where material heavier than the specific gravity of the liquid sinks to the bottom and material lighter than the specific gravity of the liquid floats on its surface. A surface skimmer 16 carries the lighter material to one side of the separator for removal, while a conveyor 27 carries material which has sunk to the bottom to the opposite side of the separator for removal. The material removed by the surface skimmer will be mainly plastics, including various rubber compositions; and the third residue will comprise metals other than ferrous, rocks and other elements called remainder in Table 1. Additional separations stages for the third residue may be added, particularly if special circumstances in a given area result in a significant quantity of a special component or material being added to the material customarily arriving in waste as typified by Table 1. Accordingly, the invention is to be construed as including all of the modifications which fall within the scope of the appended claims.

We claim:

1. A method of separating the components of a solid waste material which comprises, in substantial proportion, a substantially dry, fragmented, grannular product such as fragmented, biodegraded organic material and fragmented glass, mixed with a less-fragmented portion comprising magnetic material such as ferrous metals, non-magnetic metals, rubber and plasticss as would be produced by treating solid waste of the type collected from municipalities with pressurized steam and explosive decompression for fragmenting the product part thereof and composting for biodegrading an organic part of at least the fragmented product, the method comprising, in sequence:

a first separation step comprising placing the solid waste material on a motor vibrated screen having a mesh spacing large enough to pass the fragmented product through the screen but too small to substantially pass the less-fragmented portion of the waste material, the less fragmented portion then rolling down an incline of the screen to a conveyor and the fragmented product falling through the screen into a hopper; accumulating a head of the fragmented product over a vertically positioned throat section of an outer shell of a separation vessel connected to the bottom of the hopper for discharging the fragmented product by gravity from the hopper through the throat section into the outer shell therebeneath without permitting air to pass into the hopper from the outer shell whereby such air neither interferes with the screening step nor scatters the fragmented product separated thereby; flowing an upward stream of air from a throat section of an inner shell of said separation vessel positioned directly below the throat section of the outer shell at a velocity such that the air carries less-dense portions of the fragmented product such as biodegraded organic material therein with it for discharge from the outer shell but allows denser portions of the fragmented product such as fragmented glass to fall through the throat section of the inner shell into the inner shell; blowing air into the inner shell; and accumulating a head of the denser portion of the fragmented product over a discharge tube at the bottom of the inner shell to prevent air from passing therethrough and thereby forcing the air blown into the inner shell to flow as the stream from the throat section of the inner shell whereby the denser and less dense portions of the fragmented product are collected separately from the inner and outer shells;

conveying the material on the conveyor as a first residue of the waste material after removing the substantial proportion of the fragmented product, the first residue thus substantially corresponding to the less-fragmented portion of the solid waste material, to a second, magnetic separation step comprising passing a magnetic field through the material on the conveyor for holding the magnetic material in the first residue on the conveyor as it moves into a position in which gravity draws non-magnetic portions of the first residue from the conveyor to a vat, the magnetic material being retained on the conveyor until it reaches a position where the magnetic field no longer holds it to the conveyor, it then falling from the conveyor into a container which thereby contains only magnetic materials;

and a third separation step operative on the material which falls, as a second residue, into the vat, the vat being filled with a liquid with a specific gravity lower than that of at least some of the non-magnetic metals but higher than at least some of the plastics whereby the non-magnetic metals sink and at least the plastics with a lower specific gravity float in the liquid in the vat, the third separation step then comprising dredging at least the non-magnetic metals which sink in the liquid from the bottom of the vat and skimming at least the plastics which float on the liquid in the vat separately from the liquid.

2. In a method of separating the components of solid waste material of the type collected from municipalities and which has been treated with pressurized steam and explosive decompression for drying and fragmenting a portion of the waste and then screened to separate a fragmented residue from a less fragmented residue the latter of which is thereafter treated magnetically and then further separated by gravity flotation, the improvement comprising air separating denser and less dense portions of the fragmented residue through the steps of:

collecting the fragmented residue in a hopper accessible from beneath a screen;

accumulating a head of the fragmented residue at a vertically positioned throat section of an outer shell of a separation vessel, said throat section communicating with a discharge opening at the bottom of the hopper to permit the fragmented residue to flow by gravity from the hopper through the throat section into the outer shell therebeneath without permitting air to pass into the hopper from the outer shell through the throat section whereby such air neither interferes with the screening step nor scatters the fragmented residue separated thereby; and flowing an upward stream of air from a throat section of an inner shell of said separation vessel positioned directly below the throat section of the outer shell at a velocity such that the air carries the less dense portions of the fragmented residue with it for discharge from the outer shell but allows the denser portion of the fragmented residue to fall through the throat section of the inner shell into the inner shell.

3. A method as set forth in claim 2 wherein the step of air separating denser and less-dense portions of the fragmented product additionally comprises:

blowing air into the inner shell and accumulating a head of the denser portion of the fragmented product over a discharge tube at the bottom of the inner shell to prevent air from passing therethrough and thereby forcing the air blown into the inner shell to flow as the stream from the throat section of the inner shell.

* * * * *